(12) United States Patent
Matsubara et al.

(10) Patent No.: US 8,120,813 B2
(45) Date of Patent: Feb. 21, 2012

(54) METHOD FOR PRINTING MIXED COLOR AND BLACK AND WHITE DOCUMENTS

(75) Inventors: Shigenori Matsubara, Irvine, CA (US); Toshiro Fujimori, Laguna Beach, CA (US); Rakesh Pandit, Irvine, CA (US); Geoff W. Harmon, Mission Viejo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1181 days.

(21) Appl. No.: 11/395,585

(22) Filed: Mar. 31, 2006

(65) Prior Publication Data

US 2007/0229881 A1    Oct. 4, 2007

(51) Int. Cl.
*G06F 15/00* (2006.01)
(52) U.S. Cl. ........................................ 358/1.9
(58) Field of Classification Search ............ 358/1.9, 358/1.15, 1.13, 2.1, 1.14
See application file for complete search history.

(56) References Cited

U.S. PATENT DOCUMENTS

| | | | |
|---|---|---|---|
| 6,985,245 B1 * | 1/2006 | Takahashi | 358/1.15 |
| 2002/0114004 A1 | 8/2002 | Ferlitsch | |
| 2004/0184106 A1 * | 9/2004 | Ferlitsch | 358/2.1 |
| 2007/0201078 A1 | 8/2007 | Morales et al. | |

FOREIGN PATENT DOCUMENTS

JP    2004-341603    12/2004

OTHER PUBLICATIONS

Japanese Office Action, dated Aug. 30, 2011, in a counterpart Japanese patent application, No. JP 2007-090253.

* cited by examiner

*Primary Examiner* — Benny Tieu
*Assistant Examiner* — Sunil Chacko
(74) *Attorney, Agent, or Firm* — Chen Yoshimura LLP

(57) ABSTRACT

A method is described for managing a print shop system in which a plurality of printers are connected to and managed by a server. When a document to be printed contains both color and black and white pages, the server splits the print job into a color and a black and white sub-job. Each print job includes a job ticket containing a plurality of parameters and the document to be printed. The server splits the original print job by generating a color sub-document and a black and white sub-document based the color characteristics of the pages of the original document, and generating a color sub-job ticket and a black and white sub-job ticket based on the original job-ticket parameters, by suitably retaining some original parameters, overriding some, deleting some, retaining some with page shifting, and adding some parameters. The two sub-jobs are printed by two different printers and then merged.

17 Claims, 3 Drawing Sheets

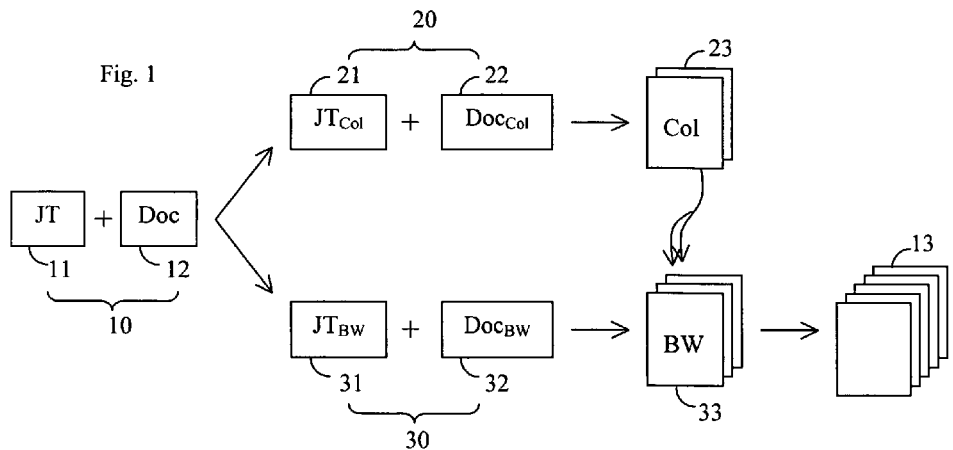

Fig. 1

| Type | JT Parameters | $JT_{BW}$ Parameters | $JT_{Col}$ Parameters |
|---|---|---|---|
| 1 | number of copies<br>orientation of print<br>output paper size<br>font<br>⋮ | keep | keep |
| 2 | input tray<br>output tray<br>⋮ | keep | override (adjust for color device) |
| 3 | staple<br>hole punch<br>fold<br>⋮ | keep | delete (to be done on black and white device) |
| 4 | per page settings | shift (exclude color pages) | shift (exclude black and white pages) |
| 5 | paper inserter unit settings | add (to insert color pages) | N/A |

| total (original Doc) | 1 | 2 | 3 | 4 | 5 | 6 | 7 | 8 | 9 | 10 | ... |
|---|---|---|---|---|---|---|---|---|---|---|---|
| b/w pages ($Doc_{BW}$) | 1 | 2 | | 3 | 4 | 5 | | 6 | 7 | | ... |
| color pages ($Doc_{Col}$) | | | 1 | | | | 2 | | | 3 | ... |

METHOD FOR PRINTING MIXED COLOR AND BLACK AND WHITE DOCUMENTS

BACKGROUND OF THE INVENTION

1. Field of the Invention

This invention relates to a method and apparatus for managing a print shop system in which a plurality of printers are connected to and managed by a server. In particular, it relates to a method and apparatus for printing documents that contain both color and black and white pages.

2. Description of Related Art

A professional print shop typically has a plurality of printers connected to a server by a network, where the server controls the printing of customer jobs on one or more printers. The printers in a print shop typically have different characteristics and capabilities. In particular, a print shop typically has both black and white printers and color printers. A conventional practice is to print documents containing only black and white pages (including gray level images) using black and white printers, and to print documents containing color pages using color printers. Printing with a color printer is typically more costly than printing with a black and white printer.

SUMMARY OF THE INVENTION

Many documents to be printed contain both color and black and white pages. Since color pages are more costly to print, it is desirable to separate a document into a color document to be printed on a color printer and a black and white document to be printed on a black and white printer.

Accordingly, the present invention is directed to a method of managing print jobs that contain both black and white and color pages.

An object of the present invention is to reduce the cost of printing when a document contains mixed color and black and white pages.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other objects, as embodied and broadly described, the present invention provides a method for managing a print shop system, the print shop system including a plurality of printers, the method being implemented on a server connected to the printers, the method including: (a) obtaining a print job including a job ticket and a source document to be printed, the job ticket containing a plurality of job ticket parameters, the source document containing a plurality of pages; (b) generating at least two sub-documents each containing one or more pages of the source document, wherein each page of the source document is contained in one sub-document; (c) generating at least two corresponding sub-job tickets each containing a plurality of sub-job ticket parameters, wherein each sub-document and the corresponding sub-job ticket constitute a sub-job; and (d) submitting each sub-job to a printer.

In another aspect, the present invention provides a computer program product that causes a data processing apparatus to perform the above method.

It is to be understood that both the foregoing general description and the following detailed description are exemplary and explanatory and are intended to provide further explanation of the invention as claimed.

BRIEF DESCRIPTION OF THE DRAWINGS

FIG. 1 schematically illustrates a print job split process.

FIG. 2 is a table illustrating the parameters in a job ticket and a method of splitting a job ticket into two sub-job tickets.

FIG. 3 illustrates the pages of an original document being split into two sub-documents.

DETAILED DESCRIPTION OF THE PREFERRED EMBODIMENTS

Figure 5:
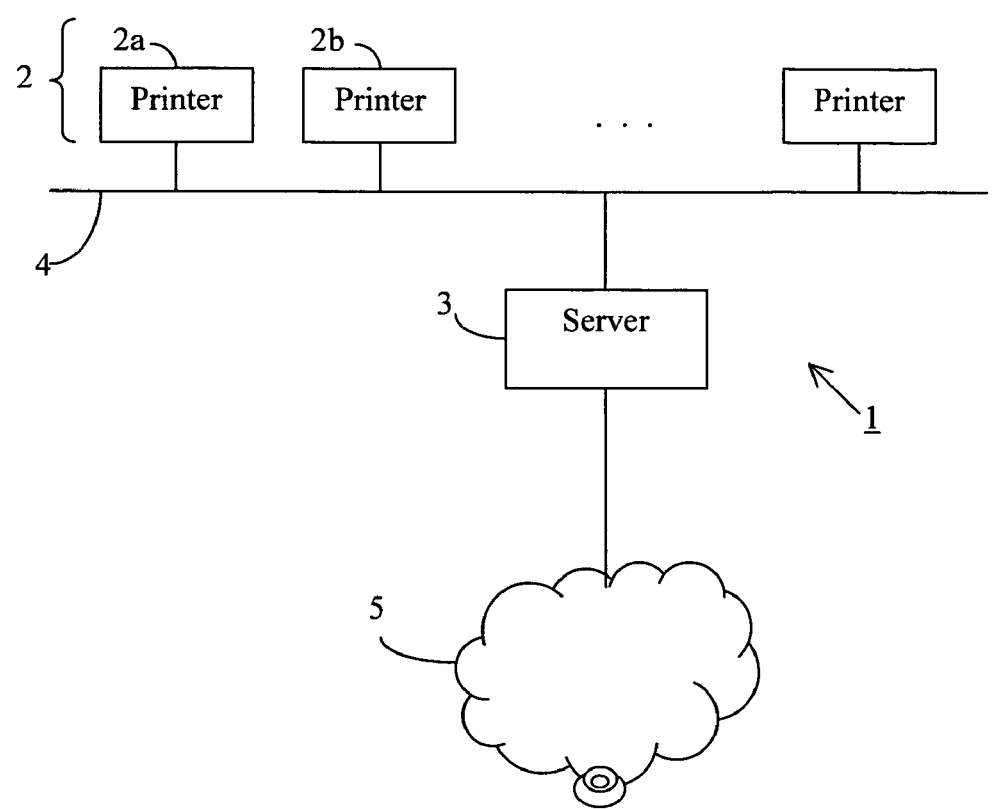
FIG. 5 schematically illustrates a print shop system having a plurality of printers connected to a server via a network in which methods according to embodiments of the present invention may be implemented.

FIG. 5 schematically shows a print shop system 1 having a plurality of printers 2a, 2b, connected to a server (or any suitable data processing apparatus) 3 via a network 4. One or more user terminals (not shown) are also connected to the server to enable print shop operators to interact with the server and the rest of the system. The server 3 is preferably also connected to an external network 5 such as the Internet for receiving print jobs (i.e. print requests from customers and documents to be printed). The server 3, under control of print shop management software, receives print jobs from customers and submits print commands and data to be printed to one or more printers 2. The print shop management software may make various management decisions, such as which printer(s) to use for a print job, either automatically or under various degree of control of an operator.

When a document to be printed (herein after referred to as the source document) is a mixed color document, i.e. one that contains both color pages and black and white pages, the server 3 makes a determination as to whether to submit the entire print job (i.e. all pages of the source document) to a color printer(s), or to split the print job into two sub-jobs by submitting the color pages to a color printer(s) and the black and white pages to a black and white printer(s). A commonly owned, co-pending U.S. patent application entitled "Print Shop Management Method and Apparatus for Printing Mixed Color and Black and White Documents" (Ser. No. 11/395,583), which is incorporated by reference herein in its entirety, describes exemplary methods for making such a determination. If the server decides to split the print job into two sub-jobs, the server splits the print job, and submits them to two different printers. The printed pages from the two printers are then combined into one printed document.

As schematically illustrated in FIG. 1, an original print job 10 includes a print request 11, sometimes referred to as a "job ticket", and a document to be printed 12. A job ticket, which is associated with the document to be printed, specifies various parameters governs the printing of the document, such as the number of copies (or prints), orientation, input tray, output tray, finishing instructions (staple, hole punch, etc.), etc. To accomplish split job printing, the original print job 10 is split into two sub-jobs, a color sub-job 20 and a black and white sub-job 30. The color sub-job 20 includes a color sub-job ticket 21 associated with a color sub-document 22, and the black and white sub-job 30 includes a black and white sub-job ticket 31 associated with a black and white sub-document 32. The color sub-job 20 is printed on a color printer according to the parameters in the color sub-job ticket to generate a color output 23, and the black and white sub-job 30 is printed on a black and white printer according to the parameters in the black and white sub-job ticket to generate a black and white output 33. The color output 23 and the black and white output 33 are merged or collated together according to the original page order of the source document 12, and finished according to the finishing instructions of the original job ticket 11 to produce a final printed document 13.

Merging or collating of outputs of two printers may be accomplished by using a paper inserter unit of one of the printers. A paper inserter unit, also called a collator, is a feeder in a printer that feeds the paper in it to the output tray of the printer, without printing on them, in a programmed order concurrently with the printing of another document by the printer. First, a first sub-document is printed on a first printer, and the output is transported to a paper inserter unit of a second printer. The second sub-document is then printed on the second printer. As a result, the pages in the paper inserter unit are merged with the concurrently printed pages of the second sub-document according to a programmed merging order. The merging order is pre-programmed into the second sub-job ticket in a method described in more detail below. FIG. 1 shows the color output as being printed first and merged into the black and white pages, but the black and white can be printed first and merged into the color pages. Preferably, the original job is split such that the printer having the finishing capabilities required by the original job will be the second printer, so that finishing can be done at the second printer after merging, without having to move the merged outputs to another finishing device. If both printers have the requisite finishing capabilities, then the original job is preferably split such that the sub-job having fewer pages is printed first and merged with the sub-job having more pages so as to reduce the time required to insert pages during merging.

As an alternative to a paper inserter unit of the second printer, a separate device may be used to merge two sets of already printed pages according to a programmed order. Such a device has two or more input units, and can be programmed to take pages from the various input units according to the programmed order to merge them into one set of pages.

When a print job is split into a color sub-job 20 and a black and white sub-job 30, the server generates two separate sub-job tickets 21 and 31 and two separate sub-documents 22 and 32 based on the original job ticket 11 and the original document 12. The Table in FIG. 2 illustrates the typical parameters in an original job ticket (the column labeled "JT Parameters") and how the various parameters are treated when a job ticket is split into two sub-job tickets (the column labeled "$JT_{BW}$ Parameters" for the black and white sub-job and the column labeled "$JT_{Col}$ Parameters" for the color sub-job). As shown in the Table, job ticket parameters fall into different types. A first type of parameters is global parameters for the print job which will apply to the black and white sub-job and color sub-job equally. These parameters include the number of copies to be made, the orientation of printing, the output paper size, the font, etc. For the first type of parameters, their values are retained for the corresponding parameters in the color sub-job ticket and the black and white sub-job ticket.

A second type of job ticket parameters includes device settings such as the input and output paper tray setting for the printer. When these parameters were originally set when the job ticket was created, they were typically intended for printing the entire job on a single printer. For this type of job ticket parameters, their values are retained for one of the two sub-jobs, and overridden for the other sub-job. In the illustrated example, these parameters are retained for the black and white sub-job, and overridden for the color sub-job by replacing them with proper values for the color printer. For example, the original input tray setting may specify tray 3 intended for the black and white printer; it may be adjusted to input tray 1 for the color sub-job ticket as is appropriate for the color printer.

A third type of job ticket parameters include finishing functions, such as staple, hole punch, fold, etc. The values of these parameters are retained for one of the two sub-jobs, and deleted for the other sub-job because finishing will be performed on only one printer after the color and black and white outputs are merged. In the illustrated example, these parameters are retained for the black and white sub-job, and deleted for the color sub-job. Note here that deleting the parameters has the same effect as assigning them null values, such as "no staple", "no hole punch", etc. In this sense, these parameters can be considered to be overridden for the color sub-job ticket, similar to the treatment of the second type of parameters.

A fourth type of job ticket parameters is per page settings, i.e. settings that are associated with specific pages of the source document. These settings will follow the page content, i.e., each setting is retained in the sub-job ticket that corresponds to the sub-document that contains the page. Due to the splitting of the original document, however, the page numbers in the sub-documents will be shifted accordingly, as illustrated in FIG. 3. FIG. 3 shows how the pages of an original document (top row) become pages of two sub-documents (middle and bottom rows). As shown, pages 3, 7, 10, ... of the original document are color pages and become pages 1, 2, 3, ... of the color sub-document. The black and white pages 1, 2, 4, 5, 6, 8, 9, ... of the original document are now pages 1, 2, 3, 4, 5, 6, 7, ... of the black and white sub-document. (Note here that the term "page numbers" does not refer to the printed page numbers on the printed outputs. The printed page numbers should retain their original numbering scheme as in the original document, whatever that may be.) Thus, for example, the per page setting (if any) for page 1 of the original document is copied to the per page setting for page 1 of the black and white sub-document; the per page setting for page 3 of the original document is copied to the per page setting for page 1 of the color sub-document; the per page setting for page 9 of the original document is copied to the per page setting for page 7 of the black and white sub-document; etc. In other words, the per page setting of the original document are retained for the black and white sub-job ticket after shifting the page numbers by excluding color pages in the original document, and the per page setting of the original document are retained for the color sub-job ticket after shifting the page numbers by excluding black and white pages in the original document. This step requires analyzing the content of the original document, and may be performed in conjunction with the step of splitting the original document into two sub-documents, described later.

A fifth type of job ticket parameters relate to merging the resulting two sub-jobs together. In the illustrated example, merging will be done by using the paper inserter unit of one of the printers (here the black and white printer), and the fifth type of parameters includes the paper inserter unit settings. Thus, the paper inserter settings are added for the black and white sub-job ticket to insert color pages. The paper inserter unit settings describe the order in which the papers in the paper inserter unit (i.e. the output of the color sub-job) are to be inserted when printing the black and white sub-job. The same information used in setting the fourth type of parameters, i.e., how the page numbers of the black and white sub-document and color sub-document are related to the page numbers of the original document, as illustrated in FIG. 3, is also used here to set the paper inserter unit settings. Thus, in the example of FIG. 3, the paper inserter unit setting will be such that the first page in the paper inserter unit will be inserted after printing the first two pages of the black and white sub-document, the second page in the paper inserter unit will be inserted after printing three more pages of the black and white sub-document, etc.

Using the above-described method, the values of the various types of job ticket parameters are assigned for the black and white and color sub-jobs and the two sub-job tickets are generated.

The Table in FIG. 2 merely illustrates an example of a job ticket and how it is split; many variations will be encountered in actual practice. For example, the second type of parameters may be kept for the color sub-job ticket and overridden for the black and white subjob ticket; the third type of parameters may be kept for the color sub-job ticket and deleted for the black and white sub-job ticket (i.e. finishing is to be done at the color printer); and the fifth type of parameters may be added to the color sub-job ticket only (i.e. to use the paper inserter unit of the color printer to merge the document). Each type of parameters may include additional parameters, or additional types of parameters may be added as appropriate, and there treatment in a job split should be based on similar considerations as described here.

Referring back to FIG. 1, in addition to generating the two sub-job tickets 21 and 31 as described above, the content of the original document 12 is analyzed to generate the color and black and white sub-documents 22 and 32. The color sub-document 22 contains all of the color pages of the original document 12, and the black and white sub-document 32 contains all of the black and white pages of the original document, in appropriate page orders such as that illustrated in FIG. 3. Typically, a document contains metadata that indicates the nature of its contents, including whether a particular page or object contains color or black and white data. This metadata can be used to detect which pages in the document are color and which pages are black and white, and to copy the appropriate page contents to the color or the black and white sub-document to generate the two sub-documents. Meanwhile, the information about which page of the original document is color or black and white is collected, and used to set the fourth and fifth types of parameters for the color and black and white sub-job tickets as described earlier.

Alternatively, if the pages in the document are to be rearranged when printed, e.g., when double-sided printing (two pages printed on two sides of each sheet of paper, also referred to as duplex) or two-on-one or multiple-on-one printing (two or more pages are printed on the same side of one sheet of paper, also referred to as N-up) is desired, then the server will analyzed the document and rearrange the pages, and determine which printed sheet (after rearrangement) is color or black and white. The color and black and white sub-documents will be generated using the rearranged pages.

Figure 4:
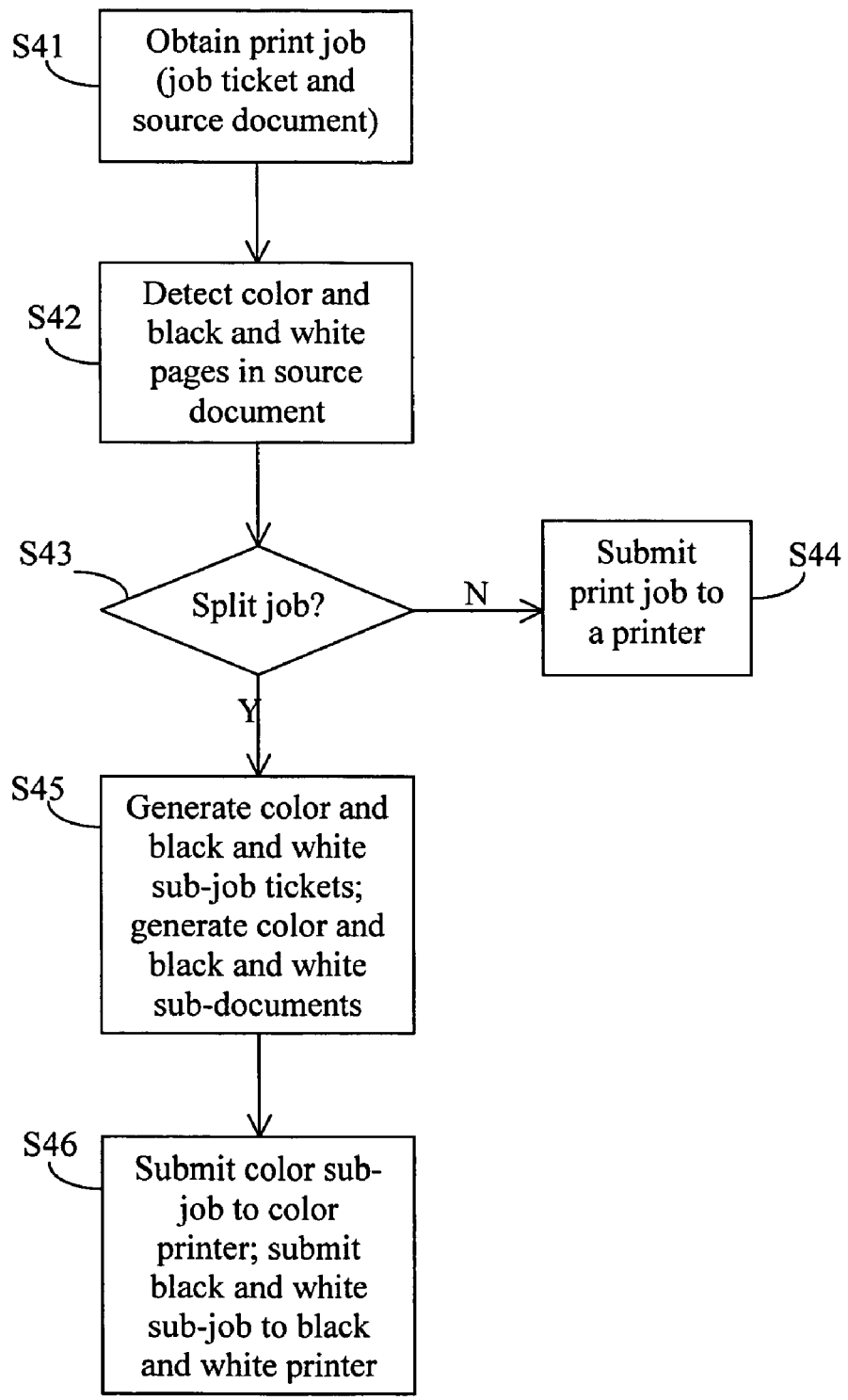
FIG. 4 is a flow chart illustrating a method for managing print jobs according to an embodiment of the present invention.

FIG. 4 illustrates a method implemented in a server for managing the printing of a mixed color and black and white document according to an embodiment of the present invention. The method can be implemented in the server by software, firmware or hardware. The software may be a part of a print shop management software program.

When a job ticket and the associated source document are received from a customer or otherwise obtained by the server (step S41), the server analyzes the source document to detect the color and black and white pages within the document (step S42). The pages may be rearranged if necessary (e.g. if duplex or N-up is required) before analyzing the page content. The server makes a determination (step S43) as to whether or not the print job is to be split into a color sub-job and a black and white sub-job. Methods of making such a determination are described in more detail in the above-referenced co-pending U.S. patent application entitled "Print Shop Management Method and Apparatus for Printing Mixed Color and Black and White Documents". If the server decides not to split the job ("N" in step S43), the server will submit the print job to a printer according to conventional printing methods (step S44). If the print job is to be split ("Y" in step S43), the server generates color and black and white sub-job tickets and color and black and white sub-documents (step S45) based on the original job ticket and the source document using the methods described earlier. The server then submits the color sub-job to a color printer and black and white sub-job to a black and white printer (step S46).

The remaining steps of the printing operation, such as transporting the output from one printer to the paper inserter unit of the other printer, will be carried out by an operator.

If merging is to be carried out using a paper inserter unit of one of the printers, the sub-job for that printer should start after the other sub-job has finished printing and an operator has transported its output to the paper inserter unit of the merging printer. In such a case, the server may submit the sub-job for the merging printer after receiving a further command from the operator indicating that this sub-job is ready to start. Alternatively, the server may submit the sub-job to the merging printer with a "hold" status, so that the merging printer will only start its printing after it receives a command to proceed from the operator (which may be entered by using a user interface device on that printer). Alternatively, all sub-jobs may be submitted to the respective printers with a "hold" status to allow the operator to start the actual printing on each printer when desired (by using the user interface device on the printers). As another alternative, the two sub-jobs (each including a sub-job ticket and a sub-document) may be saved on the server and submitted to the printers at a later time.

The above-described methods are useful for splitting an original job into two sub-jobs based on color characteristics of the source document and color capabilities of the printers in the print shop. Splitting a mixed color document to print black and white pages on a black and white printer and color pages on a color printer likely will reduce the overall cost of printing the document. The same method can be used to split an original print job into two or more sub-jobs based on other criteria or properties of the document. One such example is page splitting, where a large document is split into two or more documents so they can be printed on different printers simultaneously to reduce printing time.

While the embodiments have been described as being applied in a print shop environment, the invention is not limited to any physical setting of a shop, and can be applied to a print shop system having a distributed setting where printers at different locations are connected to a server.

It will be apparent to those skilled in the art that various modification and variations can be made in the print shop management method and apparatus of the present invention without departing from the spirit or scope of the invention. Thus, it is intended that the present invention cover modifications and variations that come within the scope of the appended claims and their equivalents.

What is claimed is:

1. A method for managing a print shop system, the print shop system including a plurality of printers, the method being implemented on a server connected to the printers, the method comprising:

(a) obtaining a print job including a job ticket and a source document to be printed, the job ticket containing a plurality of job ticket parameters, the source document containing a plurality of pages;

(b) analyzing the print job to determine whether to split the print job into at least two sub-jobs;

if the print job is to be split, (c) generating at least two sub-documents each containing one or more pages of the source document, wherein each page of the source document is contained in one sub-document;

(d) generating at least two corresponding sub-job tickets each containing a plurality of sub-job ticket parameters, at least one sub-job ticket containing at least one parameter having a value different from its value in the job ticket, wherein each sub-document and the corresponding sub-job ticket constitute a sub-job; and (e) submitting each sub-job to a printer; and (f) if the print job is not to be split, submitting the entire print job to a printer.

2. The method of claim 1, wherein the plurality of printers have different printing capabilities, and wherein the at least two sub-documents are generated based on an analysis of characteristics of each page of the source document corresponding to the printing capabilities of the printers.

3. The method of claim 1, wherein the plurality of printers have different color printing capabilities, and wherein the at least two sub-documents are generated based on an analysis of color characteristics of each page of the source document.

4. The method of claim 1, wherein the plurality of job ticket parameters include a first plurality of parameters, and wherein their values are retained for corresponding parameters in each of the sub-job ticket.

5. The method of claim 1, wherein the plurality of job ticket parameters include a second plurality of parameters, and wherein their values are retained for corresponding parameters in at least one sub-job ticket and overridden for corresponding parameters in at least one other sub-job ticket.

6. The method of claim 1, wherein the plurality of job ticket parameters include a third plurality of parameters, and wherein their values are retained for corresponding parameters in at least one sub-job ticket and deleted for at least one other sub-job ticket.

7. The method of claim 1, wherein the plurality of job ticket parameters include a fourth plurality of parameters each associated with a page of the source document, and wherein each of the fourth plurality of parameters is retained in a sub-job ticket that corresponds to a sub-document that contains the associated page.

8. The method of claim 1, wherein at least one sub-job ticket contains a paper inserter unit setting which specifies the order in which printed pages from another sub-job is inserted from a paper inserter unit when printing the sub-job.

9. A computer program product comprising a non-transitory computer usable medium having a computer readable code embodied therein for controlling a data processing apparatus, the computer readable program code configured to cause the data processing apparatus to execute a process for managing a print shop system, the print shop system including a plurality of printers, the process comprising the steps of:

(a) obtaining a print job including a job ticket and a source document to be printed, the job ticket containing a plurality of job ticket parameters, the source document containing a plurality of pages;

(b) analyzing the print job to determine whether to split the print job into at least two sub-jobs;

if the print job is to be split, (c) generating at least two sub-documents each containing one or more pages of the source document, wherein each page of the source document is contained in one sub-document;

(d) generating at least two corresponding sub-job tickets each containing a plurality of sub-job ticket parameters, at least one sub-job ticket containing at least one parameter having a value different from its value in the job ticket, wherein each sub-document and the corresponding sub-job ticket constitute a sub-job; and (e) submitting each sub-job to a printer; and (f) if the print job is not to be split, submitting the entire print job to a printer.

10. The computer program product of claim 9, wherein the plurality of printers have different printing capabilities, and wherein the at least two sub-documents are generated based on an analysis of characteristics of each page of the source document corresponding to the printing capabilities of the printers.

11. The computer program product of claim 9, wherein the plurality of printers have different color printing capabilities, and wherein the at least two sub-documents are generated based on an analysis of color characteristics of each page of the source document.

12. The computer program product of claim 9, wherein the plurality of job ticket parameters include a first plurality of parameters, and wherein their values are retained for corresponding parameters in each of the sub-job ticket.

13. The computer program product of claim 9, wherein the plurality of job ticket parameters include a second plurality of parameters, and wherein their values are retained for corresponding parameters in at least one sub-job ticket and overridden for corresponding parameters in at least one other sub-job ticket.

14. The computer program product of claim 9, wherein the plurality of job ticket parameters include a third plurality of parameters, and wherein their values are retained for corresponding parameters in at least one sub-job ticket and deleted for at least one other sub-job ticket.

15. The computer program product of claim 9, wherein the plurality of job ticket parameters include a fourth plurality of parameters each associated with a page of the source document, and wherein each of the fourth plurality of parameters is retained in a sub-job ticket that corresponds to a sub-document that contains the associated page.

16. The computer program product of claim 9, wherein at least one sub-job ticket contains a paper inserter unit setting which specifies the order in which printed pages from another sub-job is inserted from a paper inserter unit when printing the sub-job.

17. A method for managing a print shop system, the print shop system including a plurality of printers, the method being implemented on a server connected to the printers, the server further being connected to an external data processing apparatus, the method comprising:

(a) obtaining from the external data processing apparatus a print job including a job ticket and a source document to be printed, the job ticket containing a plurality of job ticket parameters, the source document containing a plurality of pages;

(b) generating at least two sub-documents each containing one or more pages of the source document, wherein each page of the source document is contained in one sub-document;

(c) generating at least two corresponding sub-job tickets each containing a plurality of sub-job ticket parameters, at least one sub-job ticket containing at least one parameter having a value different from its value in the job ticket, wherein each sub-document and the corresponding sub-job ticket constitute a sub-job; and (d) submitting each sub-job to a printer.

* * * * *